Dec. 6, 1966　　　M. M. CLARK ET AL　　　3,289,944
SPRAY NOZZLE MOUNTING AND OSCILLATING MECHANISM
Filed Aug. 20, 1964　　　　　　　　　　　　　3 Sheets-Sheet 1

INVENTORS
William T. Bennett
Merle M. Clark
BY
*J. P. Moran*
ATTORNEY

Dec. 6, 1966   M. M. CLARK ET AL   3,289,944
SPRAY NOZZLE MOUNTING AND OSCILLATING MECHANISM
Filed Aug. 20, 1964   3 Sheets-Sheet 3

United States Patent Office 3,289,944
Patented Dec. 6, 1966

3,289,944
SPRAY NOZZLE MOUNTING AND OSCILLATING MECHANISM
Merle M. Clark, Barberton, and William T. Bennett, Wadsworth, Ohio, assignors to The Babcock & Wilcox Company, New York, N.Y., a corporation of New Jersey
Filed Aug. 20, 1964, Ser. No. 390,853
1 Claim. (Cl. 239—227)

The present invention relates in general to the construction and operation of spray nozzles, and more particularly to an improved construction and operation of the oscillatory mechanism, causing the movements of spray nozzles of the type utilized in chemical recovery furnaces, such as disclosed in U.S. Patent 2,161,110.

In chemical recovery processes wherein a waste liquor, such as the "black liquor" from pulp digesters used in the kraft or sulphate process of manufacturing paper pulp, is delivered to a furnace for the recovery of inorganic chemicals and the production of useful heat by burning the combustible organic material contained in the liquor, the liquor is sprayed on the walls of the furnace as one step in the recovery process. The liquor spraying device must be capable of projecting the liquor across the furnace for deposition on the walls in such a manner as to insure proper conditions for dehydrating the liquor and the deposition of the liquor char on the hearth of the furnace.

In the present invention a spray nozzle mounting and oscillating mechanism is provided of improved reliability, simplicity of operation and adjustment, and high efficiency. The nozzle is supported on a pipe member which is mounted for rotational oscillation about its axis in a cradle which is detachably secured in a yoke rotationally oscillatable about a transverse horizontal axis. The liquor supply conduit leading to the spray nozzle is rigidly attached to a frame supporting the entire oscillating mechanism so as to avoid differential movements in the device as may be caused by temperature changes in the furnace.

The various features of novelty which characterize the invention are pointed out with particularity in the claim annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 2:
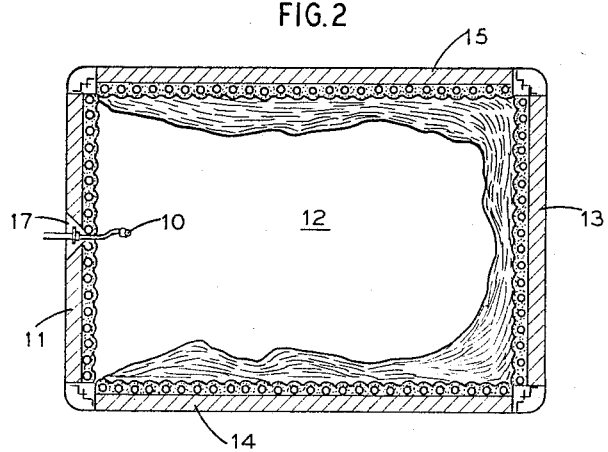
FIG. 2 is a horizontal section taken on line 2—2 of FIG. 1.
Figure 1:
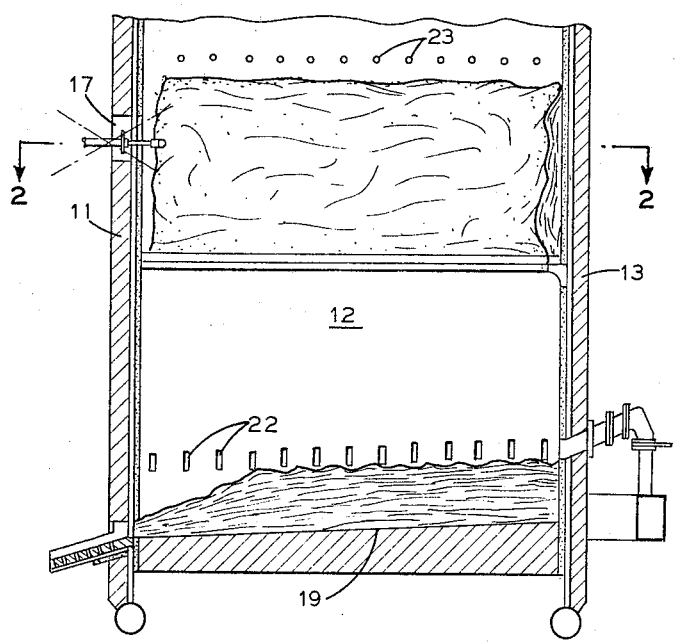
FIG. 1 is a sectional elevation of a chemical recovery furnace in which a spray nozzle is oscillated by the mechanism of the present invention.
Figure 3:
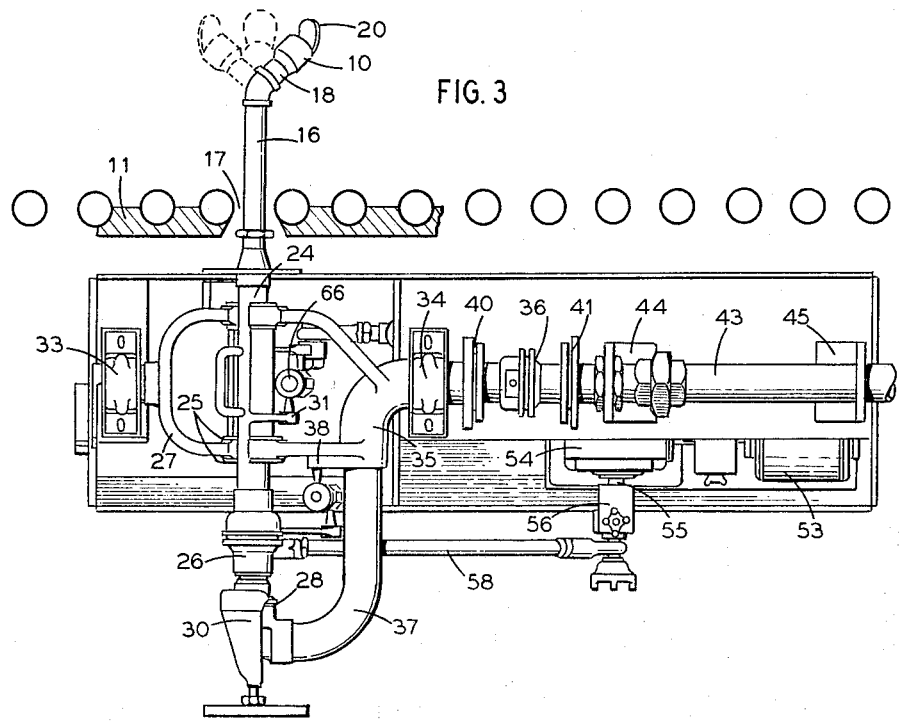
FIG. 3 is an enlarged plan view of a spray nozzle and its oscillating mechanism constructed in accordance with the present invention.

As shown in FIGS. 1 and 2, a spray nozzle 10, of the general type shown in U.S. Patent 2,161,111 is positioned adjacent the front wall 11 of a chemical recovery furnace 12. The general type of furnace illustrated is disclosed in U.S. Patent 2,161,110, wherein a waste liquor is delivered to a spray nozzle which is adapted to discharge that liquor in a flat spray over an angular spray area of approximately 180°. Since, as shown in FIGS. 1 and 2, the spray impacts the rear wall 13 and the side walls 14 and 15 in a relatively narrow band across substantially the entire horizontal cross-section of the furnace, the nozzle is advantageously mounted so as to permit continuous predetermined oscillating movements thereof to extend the area of liquor impact on the rear and side walls of the furnace. A suitable mount for this purpose is shown in FIG. 3, wherein the nozzle 10 is mounted on the inner or furnace end of a bent pipe 18 which is detachably connected at its outer end to a supply pipe 16 which extends outwardly with its axis lying in a vertical plane normal to the plane of the furance front wall 11. The assembly of the pipe 18 with the nozzle 10 projects through a vertically elongated port 17 in the front wall 11 of the furnace 12.

The nozzle 10 is provided with a spray plate 20 so that the jet of liquor discharging through the pipe 18 impacts the plate 20 and is projected in a flat spray through an angle of substantially 180°. Thus, the rotation of the pipe 16 about its axis would result in a liquor spray pattern of butterfly shape on the rear wall 13, while the deposit pattern on the side walls 14 and 15 would have a depth dependent upon the angularity of pipe 16 oscillation. To increase the area of liquor deposit on the furnace rear wall, the pipe 16 and the nozzle 10 thereon will also be oscillated in a vertical plane common with the axis of the pipe 16. The angularity of oscillation about, and in the vertical plane common with, the axis of the pipe 16 may be coordinated and regulated to obtain a desired liquor deposition pattern on the side walls 14 and 15, and the rear wall 13 of the furnace. As the deposited liquor dries on the furnace walls, chunks or masses of the dried liquor will fall from the walls for accumulation on the hearth 19 of the furnace (see FIG. 1) for smelting and recovery of chemicals therein. The smelting procedure is well known and is accomplished under reducing conditions in the lower portion of the furnace. The primary air ports 22, positioned upwardly adjacent the hearth 19, are provided with combustion air in insufficient quantities to complete the combustion of the combustible organic materials in the dried liquor or char on the hearth, while additional combustion air will be introduced through secondary air ports 23 to complete the combustion of the combustible materials contained in the gases rising through the furnace 12.

Figure 5:
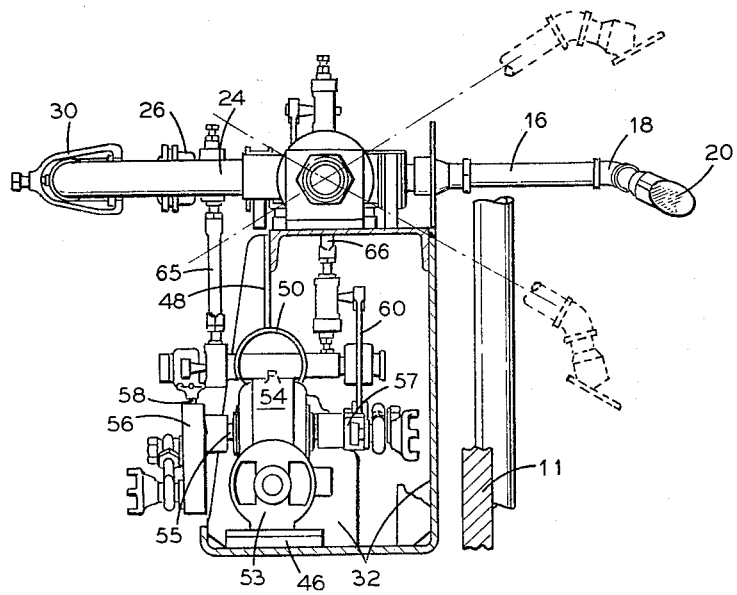
FIG. 5 is a side section view of the mechanism taken on line 5—5 of FIG. 4.

As shown, particularly in FIGS. 3 and 5, the pipe 16 is detachably connected with an enlarged pipe 24, which is clamped into a cradle 25 for rotational movement of the cradle and the pipe about an axis coinciding with the longitudinal axis of the pipe 24. The opposite end of the pipe 24 is connected through a swivel connection 26 to the end of a fixed conduit 28 mounted on a yoke 27, hereinafter described. The attachment between the pipe 24 and the end of the conduit 28 is provided with a detachable fitting including a clamp 30 so that the end of the pipe 24 is maintained in pressure-tight relation with the conduit 28 for flow of liquor therethrough. The cradle 25 is provided with a transversely extending arm 31 which is connected with the oscillating mechanism hereinafter described. With the construction described, the oscillation of the spray nozzle assembly in its supporting cradle is effected along the axis of the pipes 16 and 24. While one portion of the swivel joint 26 will be stationary, the other portion of the joint will rotate about its axis of rotation, as accomplished by operation of the oscillating mechanism.

Figure 4:
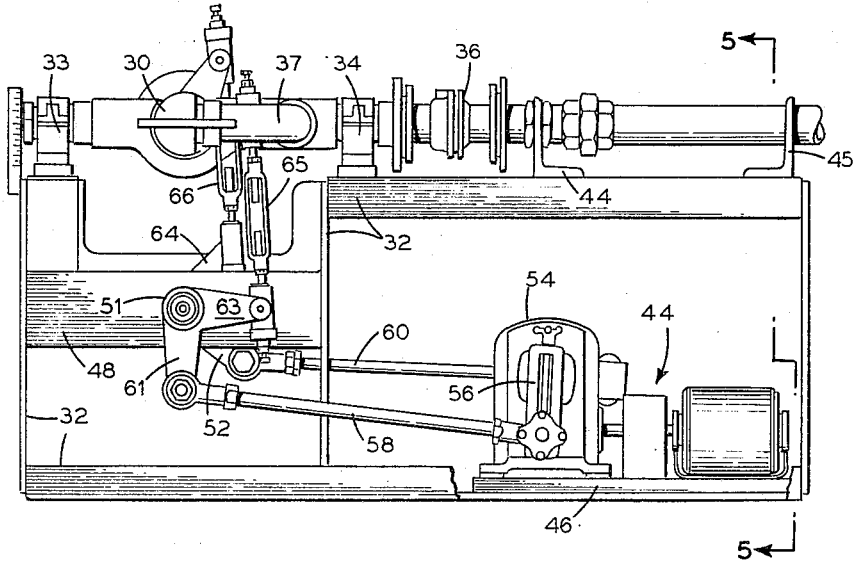
FIG. 4 is an end view of the mechanism shown in FIG. 3.

The cradle 25 in turn is supported in a yoke 27, which is mounted directly upon the frame 32 and supported in spaced bearings 33 and 34 which are split for ease of assembly and disassembly of the device. As shown in FIGS. 3, 4 and 5, the yoke 27 may be of cast construction and is provided with a hollow arm 35 which passes through the bearing 34 and connects with a swivel joint 36. The hollow arm portion of the yoke 27 is also provided with a piping extension 37 which extends rearwardly of the yoke assembly to connect with the fittings of the fixed conduit 28. As shown, an arm 38 is provided on the yoke 27 for attachment to the oscillating mechanism, hereinafter described. In operation, the oscillating mechanism rotates or oscillates the yoke in a vertical direction for vertical movement of the spray nozzle pipe 16.

With the bearing 34 supporting one end of the yoke, the integral hollow arm 35 of the yoke is connected through a flange 40 to the swivel joint 36, while the opposite end of the swivel joint is rigidly connected through a flange 41 to the discharge end 42 of a liquor supply conduit 43. The conduit is rigidly mounted on the frame 32 by spaced angle iron braces 44 and 45 so as to rigidly position the liquor supply conduit 43 and to avoid distortion of the conduit by reason of thermal changes in the length of the conduit in its connection to the source of liquor.

It will be noted that the angle iron supports and the bearings are all mounted on the rigid frame 32. The frame additionally includes a platform 46 for supporting the motorized oscillating mechanism 47 and is provided with a rigid cross member 48 beneath the yoke which also supports a tubular member 50 (see FIG. 5). The tubular member 50 is parallel to and positioned beneath the axis of rotation of the pipe 24 and forms a support for the axis of rotation of spaced bell-cranks 51 and 52 interconnected with the oscillating mechanism 47.

A constant or variable speed motor 53, mounted on the platform 46 of the frame 32 is drivingly connected with a speed reducer 54 having an output shaft 55 extending on opposite sides of the speed reducer housing. Each end of the output shaft is provided with an eccentric connection 56 and 57 pivotally supporting the driving end of a motion transmitting rod or bar 58 and 60, respectively. The opposite end of each of the connecting rods is pivotally connected to one arm 61 and 62 of a bell-crank 51 and 52, respectively where the other arm 63 and 64 of each of the bell-cranks connects through a rod 65 and 66, respectively, which is adjustable in its length. As shown particularly in FIG. 4, the upper end of the rod 65 or 66 for each operating mechanism is connected through a ball joint to the operating arms 38 and 31 mounted on the yoke and the cradle, respectively.

In operation, the rod and bell-crank mechanism connecting the speed reducer with the yoke 27 is 90° out of phase with the companion rod and bell-crank combination connected with the cradle 25. Ordinarily, the oscillating mechanism is adjusted to oscillate the spray nozzle assembly through an angle of 30–60° in both a vertical plane and about the axis of the pipe 16. The angle of oscillation is regulated by the distance between the speed reducer shaft and the pivotal connection between the eccentric connection 56 or 57 and the corresponding bar 58 or 60.

It will be noted the oscillating mechanism for the spray nozzle assembly positively connects the drive motor with the arms 31 and 38 of the cradle 25 and yoke 27 through bell-cranks pivoted about an axis substantially in vertical alignment with the axis of the pipe 24. Such an arrangement advantageously contributes to the smooth and efficient oscillation of the spray nozzle for effective distribution of liquor to the walls of the furnace 12.

While in accordance with the provisions of the statutes there is illustrated and described herein a specific embodiment of the invention, those skilled in the art will understand that changes may be made in the form of the invention covered by the claim, and that certain features of the invention may sometimes be used to advantage without a corresponding use of the other features.

What is claimed is:

In combination with a spray nozzle arranged to discharge a substantially flat semicircular spray of liquor, a frame supporting spaced bearings defining a horizontal axis, a liquor supply conduit rigidly attached to said frame in axial alignment with the horizontal axis of said bearings, a yoke mounted in said bearings for oscillation about said horizontal axis, pipe means forming part of said yoke and connecting with said liquor supply conduit through a swivel joint for flow of liquor therethrough, a cradle mounted on said yoke for oscillation about a transverse axis normal to and substantially intersecting said horizontal axis, pipe means clamped in said cradle to support said spray nozzle at one end thereof and connected with said pipe means at its opposite end through a swivel joint, means for positively oscillating said yoke about said horizontal axis through a selected angle in a vertical plane normal to said horizontal axis, means for positively oscillating said cradle about said transverse axis through a selected angle, said oscillating means including a motor driven speed reducer having oppositely extending output shafts, adjustable length eccentric crank arms attached to each of said shafts, spaced bell-cranks pivotally attached to said frame beneath said yoke, adjustable length rods connecting one end of said output shaft eccentric crank arm to said cradle through one of said bell-cranks adjacent the intersection of said horizontal axis and said vertical plane, and separate adjustable length rods connecting the other end of said shaft eccentric crank arm to said yoke through the other of said bell-cranks.

References Cited by the Examiner
UNITED STATES PATENTS

| 550,040 | 11/1895 | Busha | 239—587 X |
|---|---|---|---|
| 2,518,239 | 8/1950 | Leigh | 239—380 X |
| 2,541,695 | 2/1951 | Gangewere | 239—227 |

M. HENSON, WOOD, JR., *Primary Examiner.*

V. C. WILKS, *Assistant Examiner.*